US009572130B2

(12) United States Patent
Ioffe et al.

(10) Patent No.: US 9,572,130 B2
(45) Date of Patent: Feb. 14, 2017

(54) USER EQUIPMENT AND METHOD FOR TRANSMITTING A DATA STREAM TO AN EVOLVED NODE B

(71) Applicant: Intel IP Corporation, Santa Clara, CA (US)

(72) Inventors: Anatoliy Ioffe, Hillsboro, OR (US); Boyan Yanakiev, Aalborg (DK); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/575,448

(22) Filed: Dec. 18, 2014

(65) Prior Publication Data

US 2016/0183218 A1    Jun. 23, 2016

(51) Int. Cl.
| | |
|---|---|
| *H04W 72/00* | (2009.01) |
| *H04W 72/02* | (2009.01) |
| *H04B 7/04* | (2006.01) |
| *H04J 11/00* | (2006.01) |
| *H04L 5/00* | (2006.01) |
| *H04W 72/08* | (2009.01) |
| *H04W 88/06* | (2009.01) |

(52) U.S. Cl.
CPC .......... *H04W 72/02* (2013.01); *H04B 7/0486* (2013.01); *H04J 11/005* (2013.01); *H04L 5/0023* (2013.01); *H04W 72/085* (2013.01); *H04L 5/0048* (2013.01); *H04L 5/0053* (2013.01); *H04L 5/0091* (2013.01); *H04W 88/06* (2013.01)

(58) Field of Classification Search
CPC ... H04B 7/0632; H04B 17/309; H04B 7/0408; H04B 7/0617; H04B 7/0456; H04B 7/061; H04B 7/0684; H04B 7/0691; H04B 7/0808; H04B 7/0874; H04B 7/0413; H04B 17/318; H04B 7/0626; H04B 7/0689
USPC ..................................................... 455/452.1
See application file for complete search history.

(56) References Cited

U.S. PATENT DOCUMENTS

| | | |
|---|---|---|
| 2009/0054093 A1 | 2/2009 | Kim et al. |
| 2010/0002657 A1 | 1/2010 | Teo et al. |
| 2010/0069028 A1 | 3/2010 | Choi et al. |

(Continued)

OTHER PUBLICATIONS

"International Application Serial No. PCT/US2015/063456, International Search Report mailed Mar. 29, 2016", 4 pgs.

(Continued)

*Primary Examiner* — Kwasi Karikari
(74) *Attorney, Agent, or Firm* — Schwegman Lundberg & Woessner, P.A.

(57) ABSTRACT

In a wireless network, a user equipment (UE) can communicate with an Evolved Node B (eNodeB). During at least some times, the UE transmits a data stream to the eNodeB, over one of several available antenna states on the UE. The antenna states can include one or more tuning states for each antenna port on the UE. At predetermined times, which can be periodic, the UE ceases transmission of the data stream, transmits a test signal sequentially over each of its antenna states, receives a signal back from the eNodeB indicating which of the antenna states provides the strongest signal, and switches to the indicated antenna state. After switching, the UE can resume transmission of the data stream over the indicated antenna state. In some examples, the UE can repeat the antenna tuning/retuning process periodically.

19 Claims, 17 Drawing Sheets

(56) References Cited

U.S. PATENT DOCUMENTS

| | | | |
|---|---|---|---|
| 2010/0310005 A1* | 12/2010 | Takagi | H04B 7/061 |
| | | | 375/295 |
| 2011/0081875 A1 | 4/2011 | Imamura et al. | |
| 2013/0222515 A1* | 8/2013 | Abuan | H04N 7/14 |
| | | | 348/14.01 |
| 2014/0233665 A1 | 8/2014 | Clevorn et al. | |

OTHER PUBLICATIONS

"International Application Serial No. PCT/US2015/063456, Written Opinion mailed Mar. 29-2016", 8 pgs.

* cited by examiner

| DCI Format (FDD) | |
|---|---|
| Name of Field | Size of Field |
| Carrier indicator | 0 or 3 bits |
| RB assignment | Variable [5.3.3.1.8 in 36.212] |
| TPC command | 2 bits |
| Shift for DM-RS and OCC index | 3 bits |
| SRS request | 2 bits |
| Allocation type | 1 bit |
| MCS and RV | 5 bits |
| NDI | 1 bit |
| PMI and RI | 3 or 6 bits [5.3.3.1.8 in 36.212] |
| SRS report | 3 bits |

FIG. 7

| SRS Request | |
|---|---|
| Value of Field | Description |
| 00 | No type 1 SRS trigger |
| 01 | The 1st SRS parameter set configured by higher layers |
| 10 | The 2nd SRS parameter set configured by higher layers |
| 11 | The 3rd SRS parameter set configured by higher layers |

FIG. 8

| SRS Report Field | |
|---|---|
| Value of Field | Description |
| 000 ... 110 | Indicates offset of SF with dedicated SRS from last SF with SRS Report Field = 111 and indicates end of antenna tuning duration |
| 111 | Command to reset the SF with dedicated SRS counter and begin antenna tuning duration |

FIG. 9

```
        Upper layer antenna tuning configuration message

+- SoundingRS-UL-ConfigAntennaTuning      ::= SEQUENCE
|  +- srs-atsfCounter                     ::= INTEGER (0..1023)
|  +- srs-atsfCounterReset                ::= BOOLEAN
```

FIG. 11

USER EQUIPMENT AND METHOD FOR TRANSMITTING A DATA STREAM TO AN EVOLVED NODE B

TECHNICAL FIELD

Embodiments pertain to operations and communications performed by electronic devices in wireless networks. Some embodiments relate to periodic antenna retuning in a user equipment (UE).

BACKGROUND

A user equipment (UE) can communicate with an Evolved Node B (eNodeB). It is desirable to provide a strong signal at the eNodeB from the UE.

BRIEF DESCRIPTION OF THE DRAWINGS

FIG. 7 shows an example of a downlink control indicator (DCI) format, in accordance with some embodiments.

FIG. 8 shows an example of an SRS request, in accordance with some embodiments.

FIG. 9 shows an example of an SRS report field, in accordance with some embodiments.

FIG. 11 shows an example of an upper layer antenna tuning configuration message, in accordance with some embodiments.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
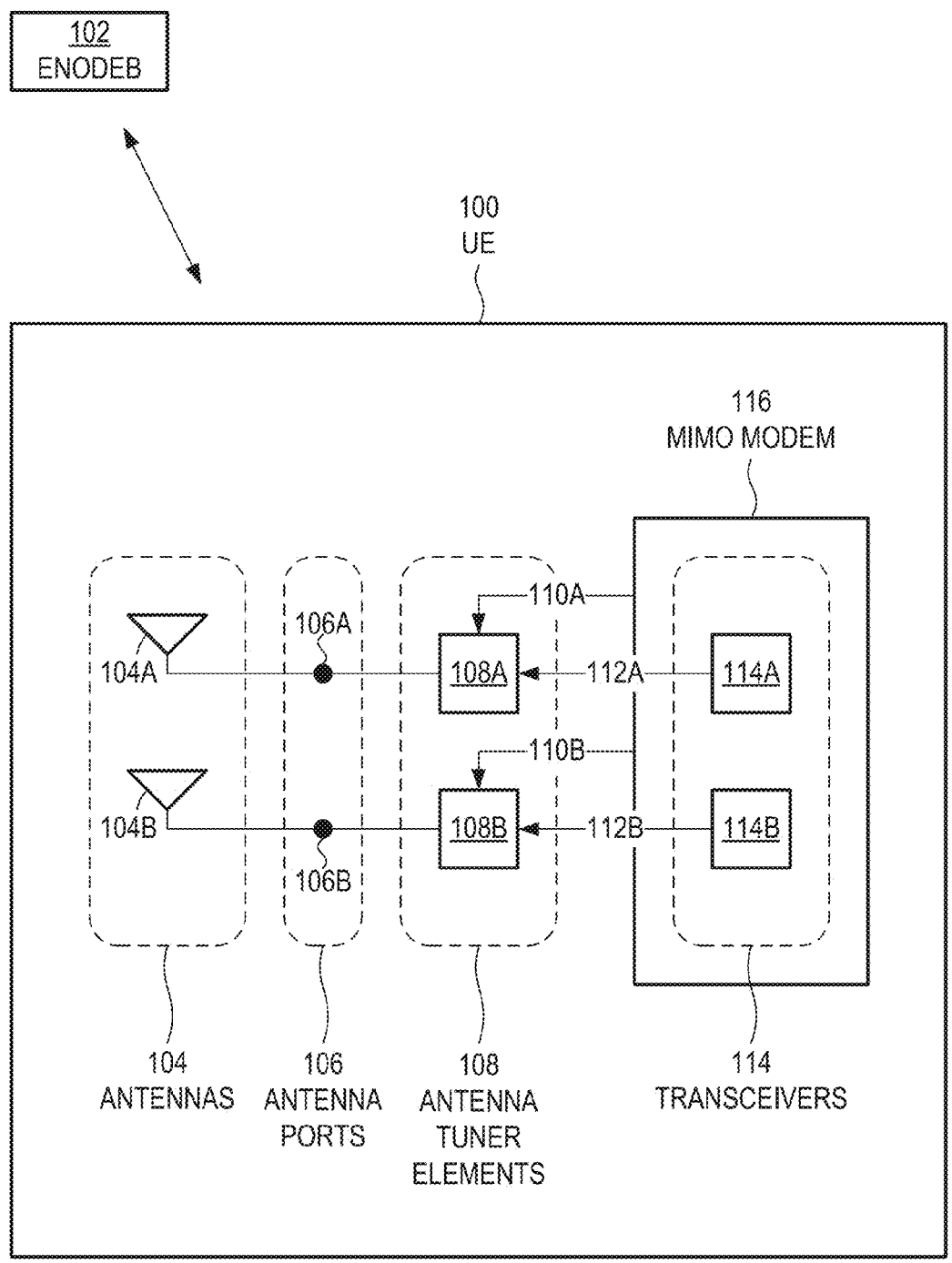
FIG. 1 shows an example of a user equipment (UE) configured to transmit a data stream to an Evolved Node B (eNodeB), in accordance with some embodiments.

FIG. 1 shows an example of a user equipment (UE) 100 configured to transmit a data stream to an Evolved Node B (eNodeB) 102. Examples of a suitable UE 100 can include a cellular telephone, a smart phone, a cellular modem, a tablet, a personal computer, or a machine-to-machine (M2M)/machine type communication (MTC) device, such as an automotive device or a sensor that can communicate with a cellular network. The UE 100 from FIG. 1 is but one example; other suitable UE configurations can also be used.

The UE 100 can include at least one antenna 104A-B. In the example of FIG. 1, the UE 100 includes a plurality 104 of antennas 104A-B; in other examples, the UE 100 can include more than two antennas. Each antenna 104A-B can be capable of transmitting data from the data stream to the eNodeB 102 at one of a plurality of selectable tuning states.

The UE 100 can include a plurality 106 of antenna ports 106A-B. In some examples, each antenna port 106A-B is connectable to a respective antenna 104A-B. In some examples, the antenna ports 106A-B can be formed as part of a system-on-chip. In these examples, the antennas 104A-B can be formed external to the system-on-chip, and attached to respective antenna ports 106A-B on the system-on-chip. In some examples, each antenna 104A-B can be electrically coupled to a respective antenna port 106A-B. The combination of antenna ports 106A-B and tuning states can form a plurality of selectable antenna states for the UE 100. In some examples, each antenna state can include one or more tuning states for each antenna port 106A-B. In some examples, the number of antenna states exceeds a number of antenna ports 106A-B on the UE 100.

A plurality 108 of antenna tuner elements 108A-B can be electrically coupled to respective antennas 104A-B through respective antenna ports 106A-B. In the example of FIG. 1, the UE 100 includes two antenna ports 106A-B; in other examples, the UE 100 can include more than two antenna ports. Each antenna tuner element 108A-B can receive a tuner control signal 110A-B that specifies a selected tuning state for the respective antenna 104A-B. Each antenna tuner element 108A-B can further receive a radio frequency (RF) signal 112A-B corresponding to data from the data stream. In these examples, the antenna tuner element 108A-B can be integrated into the system-on-chip or remain as external components while being attached to respective antenna ports 106A-B on the system-on-chip.

The UE 100 can include at least one transceiver 114A-B. In the example of FIG. 1, the UE 100 includes a plurality 114 of transceivers 114A-B. Each transceiver 114A-B can be electrically coupled to a respective antenna tuner element 108A-B. In some examples, at least one transceiver 114A-B has a radio frequency front end (RFFE) that can apply at least one of a selectable impedance or a selectable aperture to a respective antenna port 106A-B. In these examples, the combination of antenna ports 106A-B and selected impedances or selected apertures can form the plurality of selectable antenna states for the UE 100. Each transceiver 114A-B can also receive data from the data stream and generate the respective RF signal 112A-B.

A multiple-input and multiple-output (MIMO) modem 116 can be electrically coupled to the plurality 108 of antenna tuner elements 108A-B. The MIMO modem 116 can select one of the plurality 114 of transceivers 114A-B, provide data from the data stream to the selected transceiver 114A-B, and generate the tuner control signal 110A-B for the selected transceiver 114A-B.

In some examples, the UE can include circuitry, which can include the antenna tuner elements 108A-B, the transceivers 114A-B, and/or the MIMO modem 116.

Figure 2:
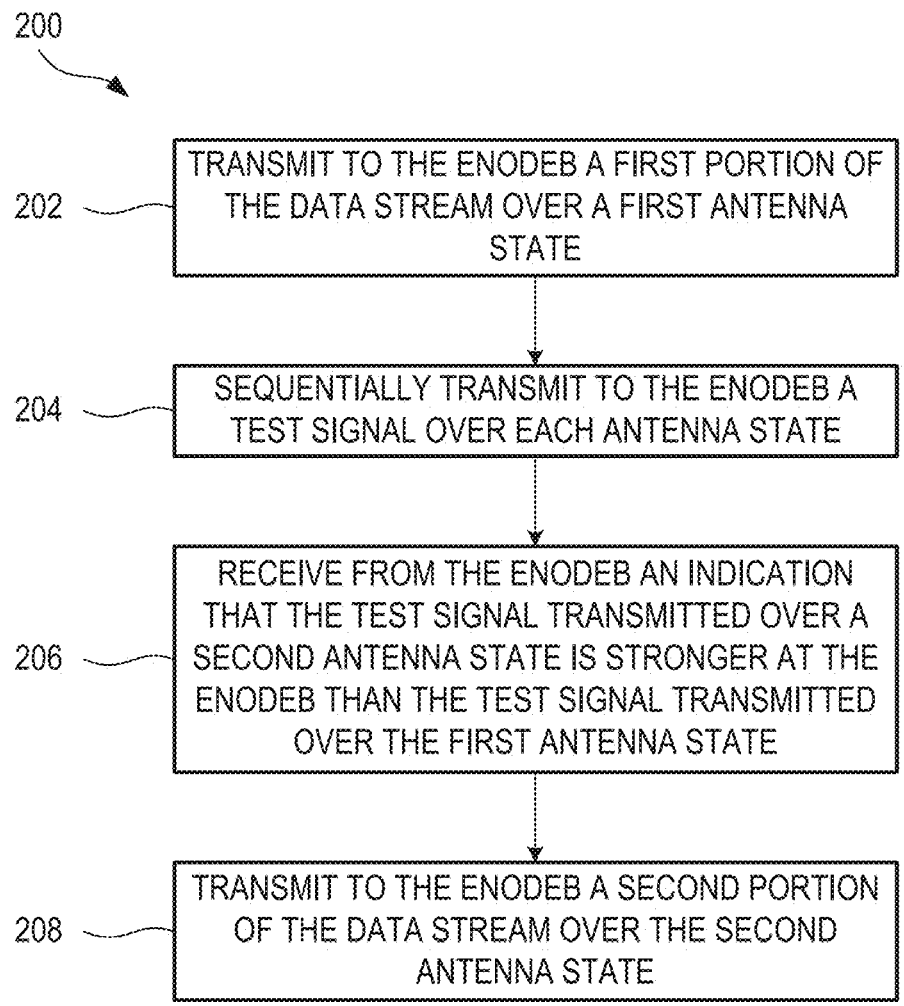
FIG. 2 shows an example of a method for transmitting a data stream from a UE to an eNodeB, in accordance with some embodiments.

FIG. 2 shows an example of a method 200 for transmitting a data stream from a UE, such as 100 (FIG. 1) to an eNodeB, such as 102 (FIG. 1). In some examples, the method 200 can be executed on a UE. In some examples, the method can be executed by circuitry on the UE, such as MIMO modem 116 (FIG. 1). In some examples, the method 200 can be executed by a non-transitory computer-readable medium containing instructions which, when executed, perform operations to configure a UE to transmit a data stream to an eNodeB. In some examples, the UE can include a plurality of antenna states configured for transmitting from the UE. The method 200 is but one example; other suitable methods can also be used.

At 202, method 200 can transmit to the eNodeB a first portion of the data stream over a first antenna state, of the plurality of antenna states. At 204, method 200 can sequentially transmit to the eNodeB a test signal over each antenna state in the plurality. In some examples, the test signal can be the same for each antenna state. In other examples, the test signal can differ for at least two of the antenna states. In some examples, the test signal can include one or more pulses at a specified frequency. At 206, method 200 can receive from the eNodeB an indication that the test signal transmitted on a second antenna state, of the plurality of antenna states, is stronger at the eNodeB than the test signal transmitted on the first antenna state. In some examples, the indication from the eNodeB can specify which of the antenna states provides the strongest reception at the eNodeB. In some examples, the indication from the eNodeB can specify that the second antenna state provides the strongest reception at the eNodeB. At 208, method 200 can transmit to the eNodeB a second portion of the data stream on the second antenna state.

In some examples, the UE can further include at least one antenna port. In some of these examples, the UE can further include at least one transceiver having a radio frequency front end (RFFE) that can apply a selectable tuning state to a respective antenna port. In these examples, each antenna state can comprise a unique combination of antenna port and tuning state. In these examples, the RFFE can select each tuning state by applying at least one of a selectable impedance or a selectable aperture to the respective antenna port. In some of these examples, the number of antenna states in the plurality can exceed a number of antenna ports on the UE. In some examples, the UE can further include at least one antenna electrically coupled to a respective antenna port.

In some examples, the sequential transmission can begin and end at first and second predetermined times during the data stream transmission. In some of these examples, between third and fourth predetermined times during the data stream transmission, the UE can sequentially transmit to the eNodeB a test signal on each antenna state in the plurality. In some of these examples, the UE can receive from the eNodeB an indication that a third antenna state, of the plurality of antenna states, provides the strongest of the received test signals at the eNodeB. In some of these examples, the UE can transmit to the eNodeB a third portion of the data stream on the third antenna state.

In some examples, elements 202-208 can be repeated periodically, for instance, at predetermined times during the data stream transmission.

In a specific example, in a wireless network, a UE, such as 100 (FIG. 1), can communicate with an eNodeB, such as 102 (FIG. 1). In this example, during at least some times, the UE 100 transmits a data stream to the eNodeB 102 over one of several available antenna states on the UE 100. In this example, the antenna states can include one or more tuning states for each antenna port, such as 106A-B (FIG. 1) on the UE 100. In this example, at predetermined times, which can be periodic, the UE 100 ceases transmission of the data stream, transmits a test signal sequentially on each of its antenna states, receives a signal back from the eNodeB 102 indicating which of the antenna states provides the strongest signal, and switches to the indicated antenna state. After switching, the UE 100 can resume transmission of the data stream over the indicated antenna state. In some examples, the UE 100 can repeat the antenna tuning/retuning process periodically.

Updating the UE 100 to use the antenna state that produces the strongest signal at the eNodeB 102 can improve the performance of the UE 100, particularly if the UE 100 moves with respect to the eNodeB 102. For example, if the UE 100 is a cellular telephone, updating the cellular telephone to use the antenna state that produces the strongest signal at the eNodeB 102 can improve the link quality between the eNodeB 102 and the UE 100, and in some cases can help reduce instances of dropped calls or improve the link data rate (throughput). In some examples, tuning the UE antenna(s), such as 104A-B (FIG. 1), using feedback from the eNodeB 102 can be applied to Long Term Evolution (LTE) Frequency Division Duplex (FDD) and Time Division Duplex (TDD) networks and can be implemented with changes to the existing LTE standard.

Using feedback from the eNodeB 102 allows the UE 100 to tune its antennas 104A-B in a closed-loop manner This represents a significant improvement over tuning protocols that operate in an open-loop manner and do not use feedback from the eNodeB 102. Some examples of open-loop antenna tuning protocols can use a number of passive antenna elements, corresponding to a multiple-input and multiple-output (MIMO) order supported by a UE category. Some examples of open-loop antenna tuning protocols can integrate switch diversity configurations. Some examples of open-loop antenna tuning protocols can drive antenna selection by external sensor inputs or by an antenna-selective precoding matrix feedback mechanism available in a technical specification, such as the LTE Release 10 specification. Some examples of open-loop antenna tuning protocols can couple the number of UE antenna tuning states to the number of UE antenna ports, such as 106A-B (FIG. 1), thereby restricting the number of available UE antenna tuning states. By decoupling the UE antenna states from the number of UE antenna ports 106A-B, the closed-loop tuning protocol discussed herein can increase the number of available antenna tuning states beyond a fixed number of MIMO modem transceiver elements, such as 114A-B (FIG. 1), which correspond to the number of antenna ports 106A-B. The closed-loop tuning protocol discussed herein differs from digital beamforming in that the closed-loop tuning protocol discussed herein can use analog circuitry to modify the antenna response of the UE by searching over the analog RF states of the tunable antenna.

Figure 3:
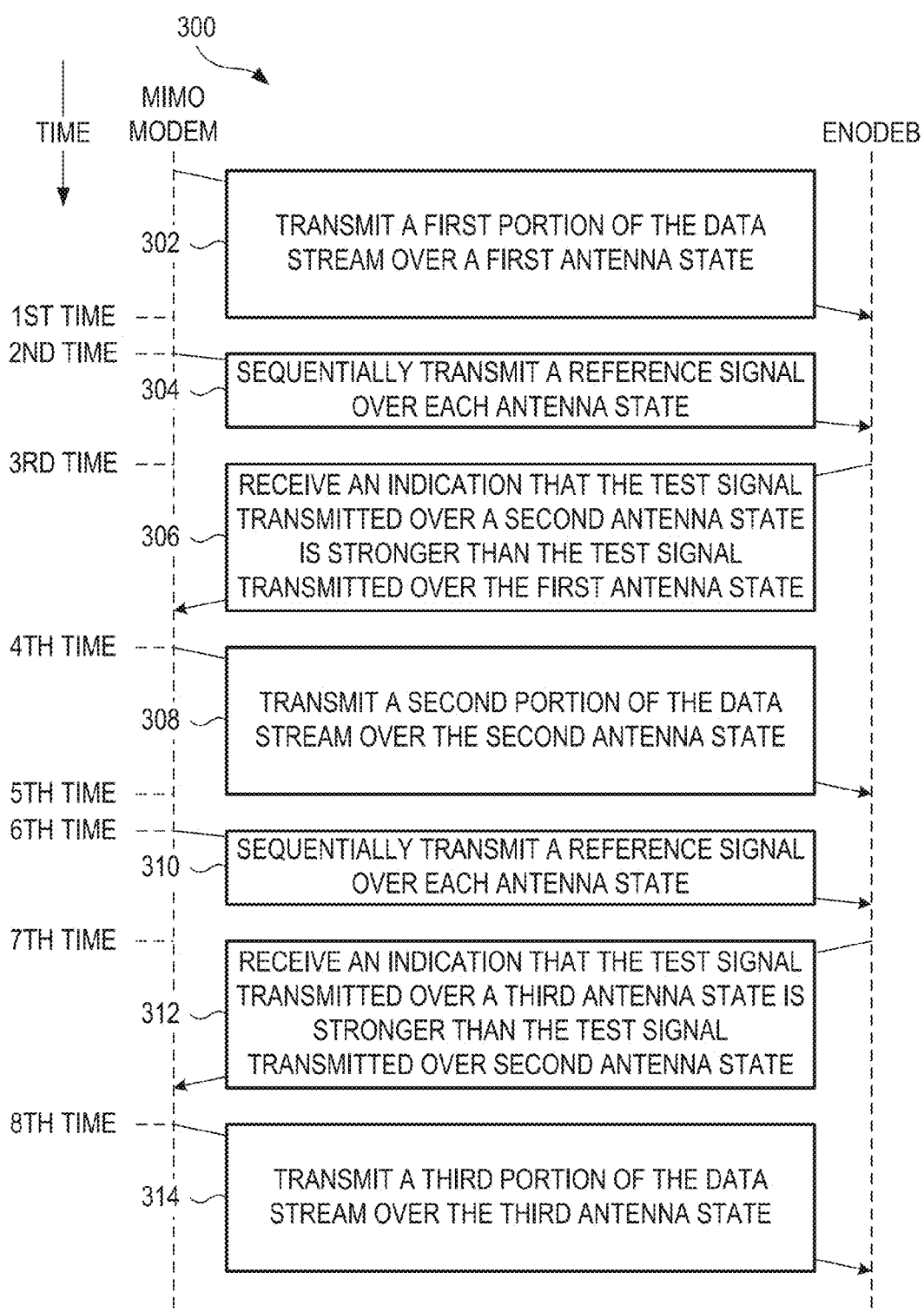
FIG. 3 shows an example of a transmission and reception sequence for circuitry, in accordance with some embodiments.

FIG. 3 shows an example of a transmission and reception sequence 300 for circuitry, such as MIMO modem 116 (FIG. 1). The sequence 300 of FIG. 3 is but one example; other sequences can also be used.

At 302, the MIMO modem can transmit to the eNodeB a first portion of the data stream over a first antenna state, of the plurality of antenna states. The first portion transmission can cease at a first predetermined time.

At 304, the MIMO modem can sequentially transmit to the eNodeB a test signal over each antenna state in the plurality. The antenna states can include the combinations of antenna and tuning state, and/or combinations of antenna port and tuning state. The sequential transmission can begin at a second predetermined time.

At 306, the MIMO modem can receive from the eNodeB an indication that the test signal transmitted over a second antenna state, of the plurality of antenna states, is stronger than the test signal transmitted over the first antenna state. In some examples, the MIMO modem can receive from the eNodeB an indication that a second antenna state, of the plurality of antenna states, provides the strongest of the received test signals at the eNodeB. The receiving can begin at a third predetermined time.

At 308, the MIMO modem can transmit to the eNodeB a second portion of the data stream over the second antenna state. The second portion transmission can begin at a fourth predetermined time. In some examples, the first and second antenna states are different; in other examples, the first and second antenna states are the same.

In some examples, the sequence 300 of FIG. 3 can repeat periodically. For instance, the MIMO modem can cease transmitting to the eNodeB the second portion of the data stream over the second antenna state at a fifth predetermined time. At 310, the MIMO modem can sequentially transmit to the eNodeB a test signal over each antenna state in the plurality beginning at a sixth predetermined time. At 312, the MIMO modem can receive an indication that the test signal transmitted over a second antenna state, of the plurality of antenna states, is stronger than the test signal transmitted over the first antenna state. In some examples, the MIMO modem can receive from the eNodeB an indication that a third antenna state, of the plurality of antenna states, provides the strongest of the received test signals at the eNodeB at a seventh predetermined time. At 314, the MIMO modem can transmit to the eNodeB a third portion of the data stream over the third antenna state beginning at an eighth predetermined time. In some examples, the second and third antenna states are different; in other examples, the second and third antenna states are the same. One of ordinary skill in the art will readily understand that FIG. 3 is not drawn to scale.

In some examples, each antenna state includes a combination of antenna and tuning state for the antenna. In some examples, each antenna state is a unique combination of antenna and tuning state. In some examples, two different antenna states include the same antenna and different tuning states. In some examples, two different antenna states include different antennas and the same tuning state. In some examples, two different antenna states include different antennas and different tuning states.

The following discussion and figures and describe specific examples of how a wireless network would implement the antenna retuning described above and shown in FIGS. 1-3. For instance, the communication protocols of FIGS. 1-3 can be incorporated into a wireless network standard that governs communication between UEs and eNodeBs in the network.

Figure 4:
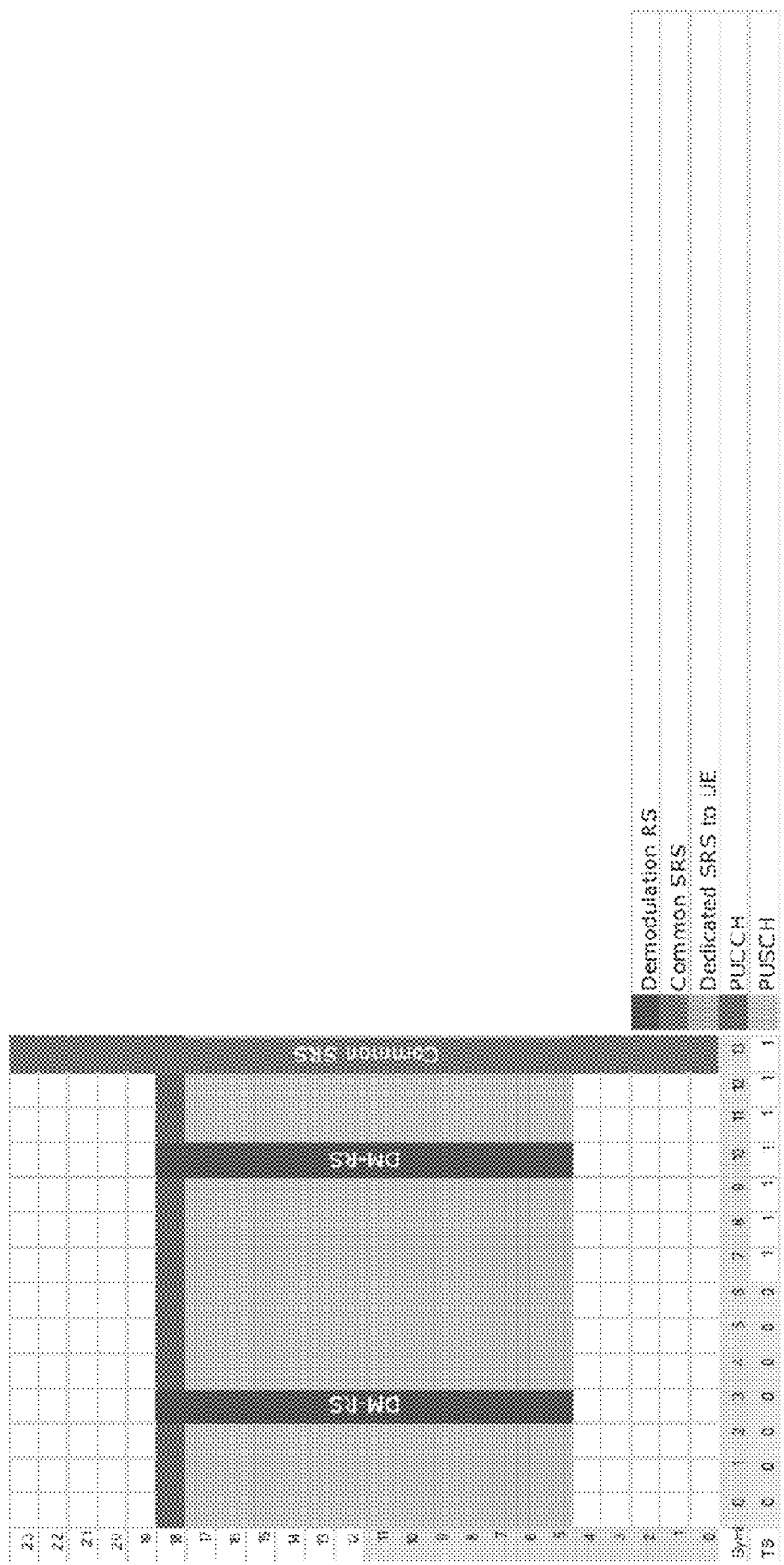
FIG. 4 shows an example of an uplink Long Term Evolution (LTE) frame structure, with a Sounding Reference Signal (SRS) symbol identified, in accordance with some embodiments.

FIG. 4 shows an example of an uplink Long Term Evolution (LTE) frame structure, with a Sounding Reference Signal (SRS) symbol identified. The resource element allocations shown in FIG. 4 are but one example, and can vary as needed.

Prior to each dedicated SRS transmission that is part of the eNodeB-controlled antenna tuning process, the UE selects a new antenna state and transmits the dedicated SRS. Such a subframe is termed the Antenna Tuning Subframe (ATSF). For example, if the UE includes four antennas and three tuning states per antenna (totaling $3^4$, or 81, antenna states), then the UE performs 81 SRS transmissions to the eNodeB, with one SRS transmission in each antenna state. Upon completion of the SRS transmissions, the eNodeB has a set of measurements of the uplink SRS transmissions across a number of UE antenna states and can signal back to the UE the preferred state. The eNodeB can also signal the Rank Indicator and Precoding Matrix (RI-PMI) information associated with the preferred UE antenna state. In some examples, the eNodeB can additionally signal other information about the tuning selection or measurements made at the eNodeB to enhance performance.

Figure 5:
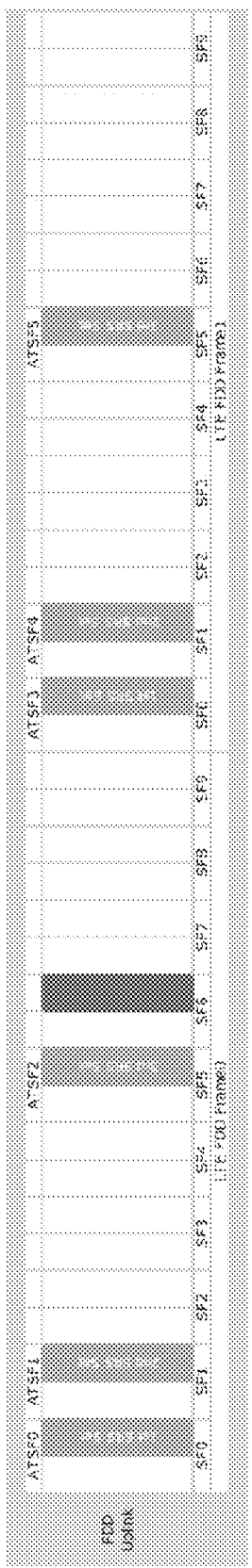
FIG. 5 shows an example of an uplink FDD LTE with antenna tuning subframes, in accordance with some embodiments.
Figure 6:
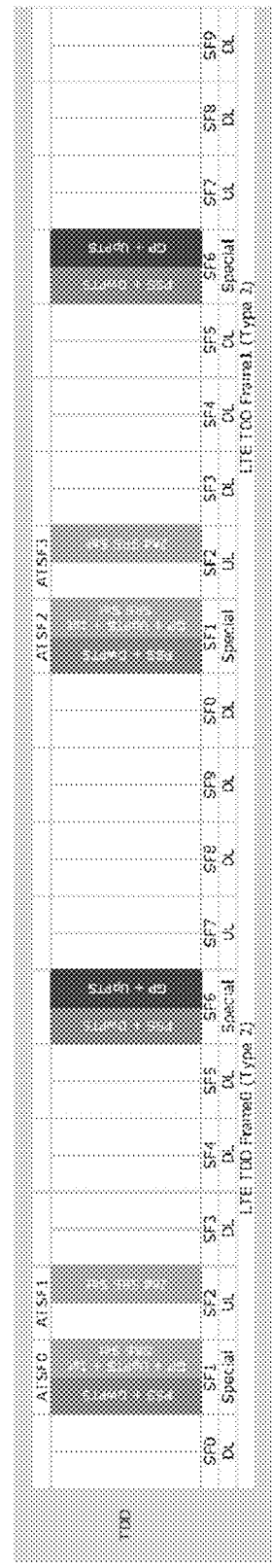
FIG. 6 shows an example of a TDD LTE with antenna tuning subframes, in accordance with some embodiments.

FIG. 5 shows an example of an uplink FDD LTE with Antenna Tuning Subframes (ATSF). FIG. 6 shows an example of a TDD LTE with Antenna Tuning Subframes (ATSF). FIGS. 5 and 6 show dedicated SRS transmissions scheduled within the configured SRS channel, which can allow the eNodeB to perform individual measurements of uplink transmissions as a function of different UE antenna tuning states. The eNodeB can assign the full bandwidth or a portion of the bandwidth for the dedicated SRS transmissions, as needed.

In some examples, the antenna retuning process discussed herein is accomplished with changes only in the physical layer. This is referred to as the physical layer approach, which is shown in FIGS. 7-10 and discussed below.

FIG. 7 shows an example of a Downlink Control Indicator (DCI) format. In the example of FIG. 7, a DCI message, transmitted to the UE in the Physical Downlink Control Channel (PDCCH), can be modified to a new format (based on Format 4). The eNodeB can send an SRS report field to the UE using the FDD format of FIG. 7, or another suitable format. The SRS report field can begin the antenna tuning process and can maintain a counter of the Antenna Tuning Subframes (ATSF). FIG. 8 shows an example of an SRS request. FIG. 9 shows an example of an SRS report field. The SRS request and SRS report field of FIG. 8-9 are merely examples; other suitable SRS requests and SRS report fields can also be used.

Figure 10:
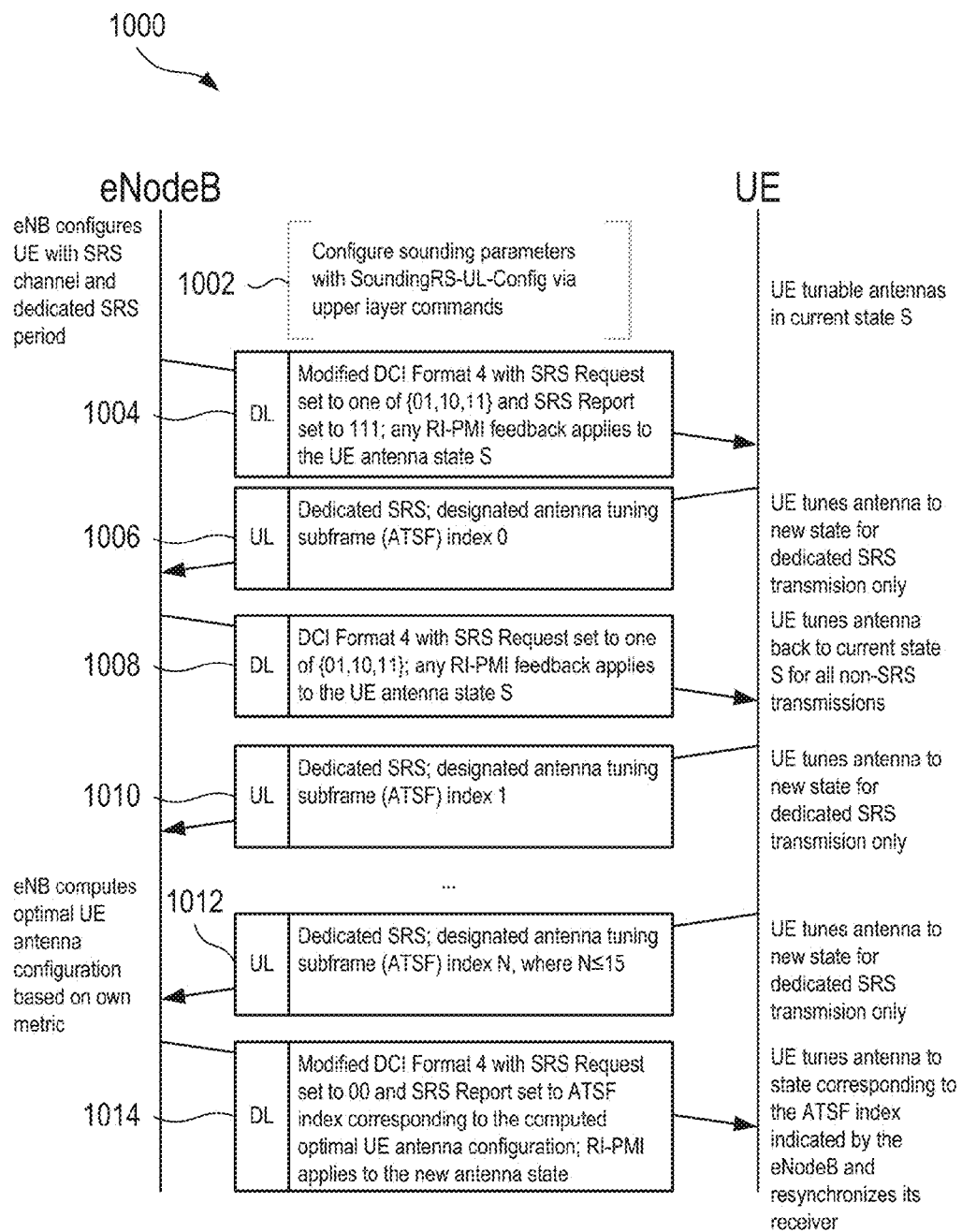
FIG. 10 shows an example of an antenna tuning procedure between the eNodeB and the UE, for the physical layer approach, in accordance with some embodiments.

FIG. 10 shows an example of an antenna tuning procedure 1000 between the eNodeB and the UE, for the physical layer approach. The antenna tuning procedure 1000 is but one example; other suitable antenna tuning procedures can also be used.

At 1002, the SRS channel and the dedicated SRS configuration for the UE via upper layer messaging are established. The establishing can be performed by the eNodeB, by the UE, or by an additional element connected to the wireless network.

At 1004, the eNodeB sends the modified DCI Format 4 (FIG. 7) message to the UE with the SRS Request field set to select one of the pre-configured SRS parameter sets and with the SRS Report field set to 111 to trigger the start of the antenna tuning process at the UE.

At 1006, upon receiving the message, the UE tunes its antenna to a new antenna state, the UE transmits the dedicated SRS, and the UE tunes its antenna state back to its previous operating antenna state. The eNodeB scheduler implementation can help reduce errors in the downlink by not scheduling PDSCH transmissions to the UE during the subframes that contain dedicated SRS transmissions used in this antenna tuning procedure.

At 1008, the eNodeB sends a DCI Format 4 message to the UE, to triggers the UE to advance to the next antenna state.

At 1010 and 1012, the eNodeB and UE repeat elements 1006 and 1008 until there are N antenna state transmissions from the UE to the eNodeB. N can be less than or equal to the maximum integer that can be represented by the number of bits of the SRS report field (FIG. 9) minus 1.

As the eNodeB collects the dedicated SRS transmissions over N UE antenna tuning states, the eNodeB computes a figure of merit that allows it to select the optimal UE antenna tuning state. At 1014, the eNodeB transmits the modified DCI Format 4 message to the UE with the SRS Report field set to the ATSF index corresponding to the eNodeB's choice of the optimal UE antenna tuning state along with the RI-PMI information corresponding to this UE antenna tuning state. The UE then tunes its antenna to the state indicated by the eNodeB, re-synchronizes to the channel, and continues operation with the new antenna state.

In some examples, the antenna retuning process discussed herein is accomplished with changes only in the MAC layer specification. The MAC layer specification approach would reuse the existing sounding procedure in the physical layer available in LTE Release 10. This is referred to as the upper layer approach, which is shown in FIGS. 11-12 and discussed below.

FIG. 11 shows an example of an upper layer antenna tuning configuration message. In the example of FIG. 11, the upper layer messaging option initiates and terminates the antenna tuning process with the upper layer configuration message and utilizes the already existing dedicated SRS procedures for the UE via the DCI Format 4 sounding trigger. The MAC layer approach differs from the physical layer approach by having an additional delay in starting and terminating the antenna tuning procedures via the upper layers, and by the ability to accommodate more UE antenna tuning states due to a larger bit width of the ATSF counter.

Figure 12:
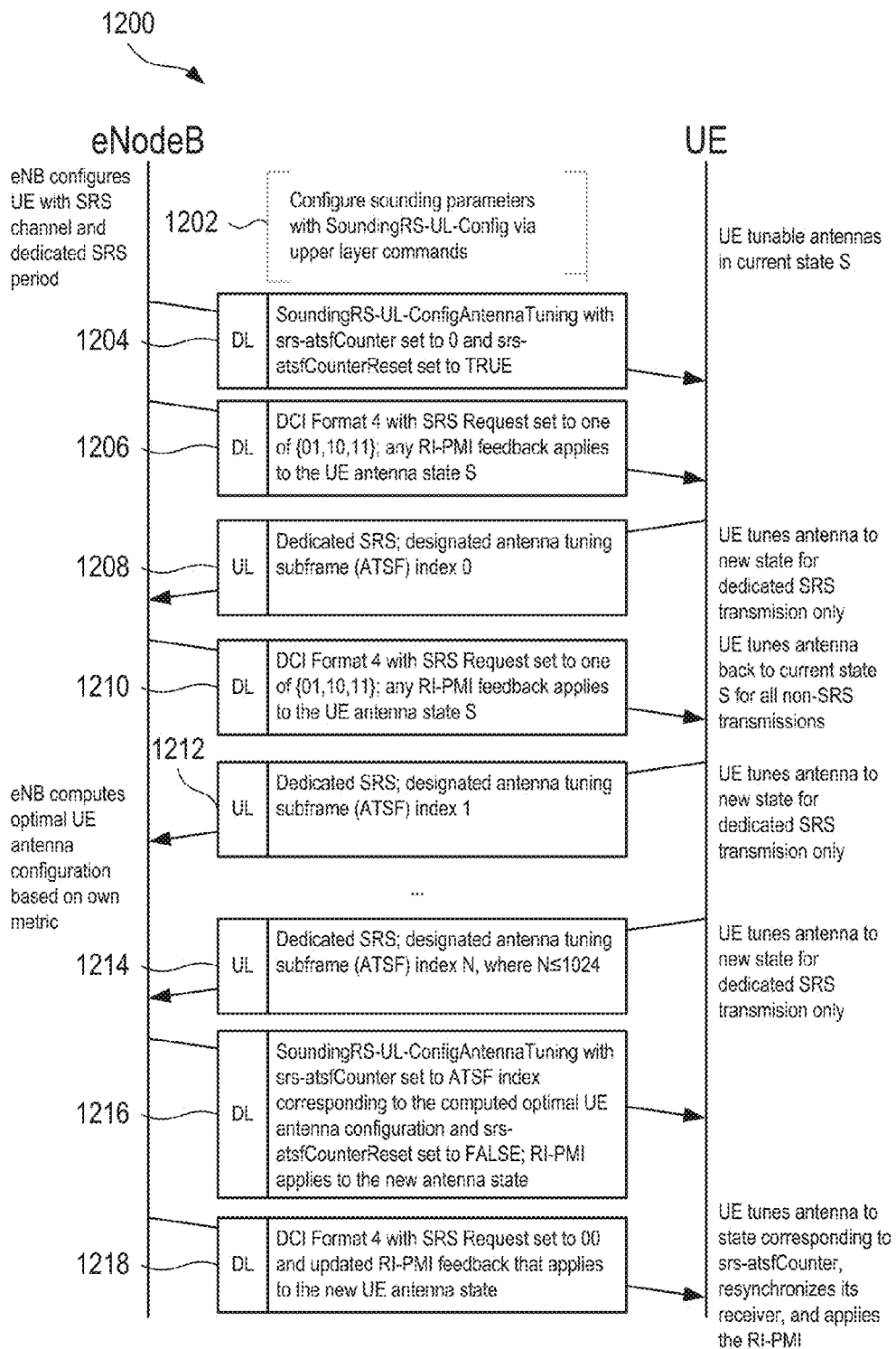
FIG. 12 shows an example of an LTE closed loop antenna tuning algorithm flow (upper layer option), in accordance with some embodiments.

FIG. 12 shows an example of an antenna tuning procedure 1200 between the eNodeB and the UE, for the upper layer approach.

At 1202, the SRS channel and the dedicated SRS configuration for the UE via upper layer messaging are established. The establishing can be performed by the eNodeB, by the UE, or by an additional element connected to the wireless network.

At 1204, the eNodeB sends an upper layer antenna tuning configuration message, such as the message of FIG. 11, to the UE. The message sets the field srs-atsfCountReset to TRUE.

At 1206, the eNode B sends a DCI Format 4 message with an SRS request to the UE with the SRS Request field set to select one of the pre-configured SRS parameter sets.

At 1208, upon receiving the message, the UE tunes its antenna to a new antenna state, UE transmits the dedicated SRS, and tunes its antenna state back to its previous operating antenna state.

At 1210, 1212, and 1214, the eNodeB and UE repeat elements 1206 and 1208 and 1008 until there are N antenna state transmissions from the UE to the eNodeB. In this example, N can be less than or equal 1024.

At 1216, the eNodeB sends an upper layer antenna tuning configuration message, such as the message of FIG. 11, to the UE. The message sets the field srs-atsfCountReset to FALSE.

As the eNodeB collects the dedicated SRS transmissions over N UE antenna tuning states, the eNodeB computes a figure of merit that allows it to select the optimal UE antenna tuning state. At 1218, the eNodeB transmits the modified DCI Format 4 message to the UE communicating the eNodeB's choice of the optimal UE antenna tuning state along with the RI-PMI information corresponding to this UE antenna tuning state. The UE then tunes its antenna to the state indicated by the eNodeB, re-synchronizes to the channel, and continues operation with the new antenna state.

There can be instances when a network does not support eNodeB control, for example, in a legacy network. For these instances, a legacy fallback mode for antenna tuning can allow a UE to tune its antennas, using signals from the eNodeB, while operating in a legacy network. To determine an optimal tuning state for each antenna, the UE seeks intervals in the LTE downlink to select a new tuning state and to receive the known reference signal from the eNodeB. These intervals are termed antenna tuning zones (ATZ).

Figure 13:
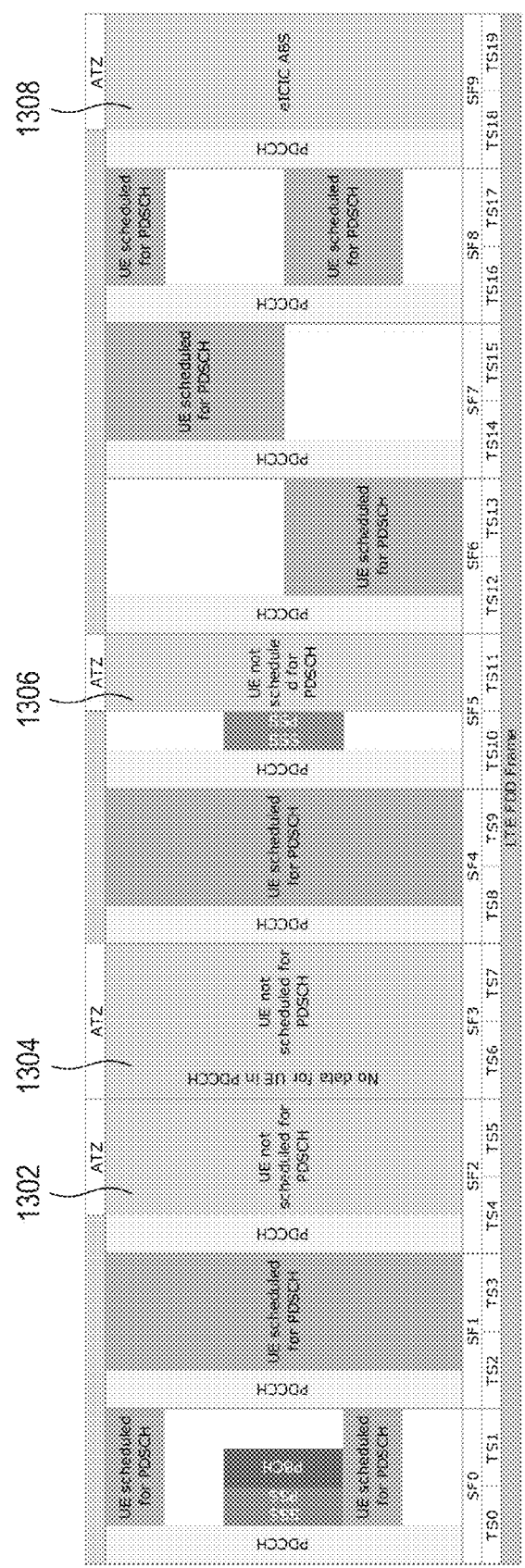
FIG. 13 shows four examples of locations where open loop antenna tuning zones (ATZ) can be positioned in a generic FDD LTE network, in accordance with some embodiments.

FIG. 13 shows four examples of locations where open loop antenna tuning zones (ATZ) can be positioned in a generic FDD LTE network; other examples can also be used.

Element 1302 shows an example of an ATZ over a partial subframe. At 1302, the UE receives the control information in the PDCCH, determines no data is scheduled in the PDSCH of the same subframe, and designates all remaining symbols as ATZ.

Element 1304 shows an example of an ATZ over a full subframe. At 1304, the UE determines from prior PDCCH information that it does not expect any control data from the eNodeB in this subframe, and it designates the entire subframe as ATZ.

Element 1306 shows an example of an ATZ over a single time slot. At 1306, the UE receives both the PDCCH and the remaining symbols in the first time slot of the subframe, determines that no data is expected in the second time slot, and it designates the second time slot of the subframe as ATZ.

Element 1308 shows an example of an ATZ over an almost blank subframe (ABS). At 1308, the UE is assumed to be operating on a network supporting enhanced inter-cell interference cancellation (eICIC), and it designates the entire ABS as ATZ.

Figure 14:
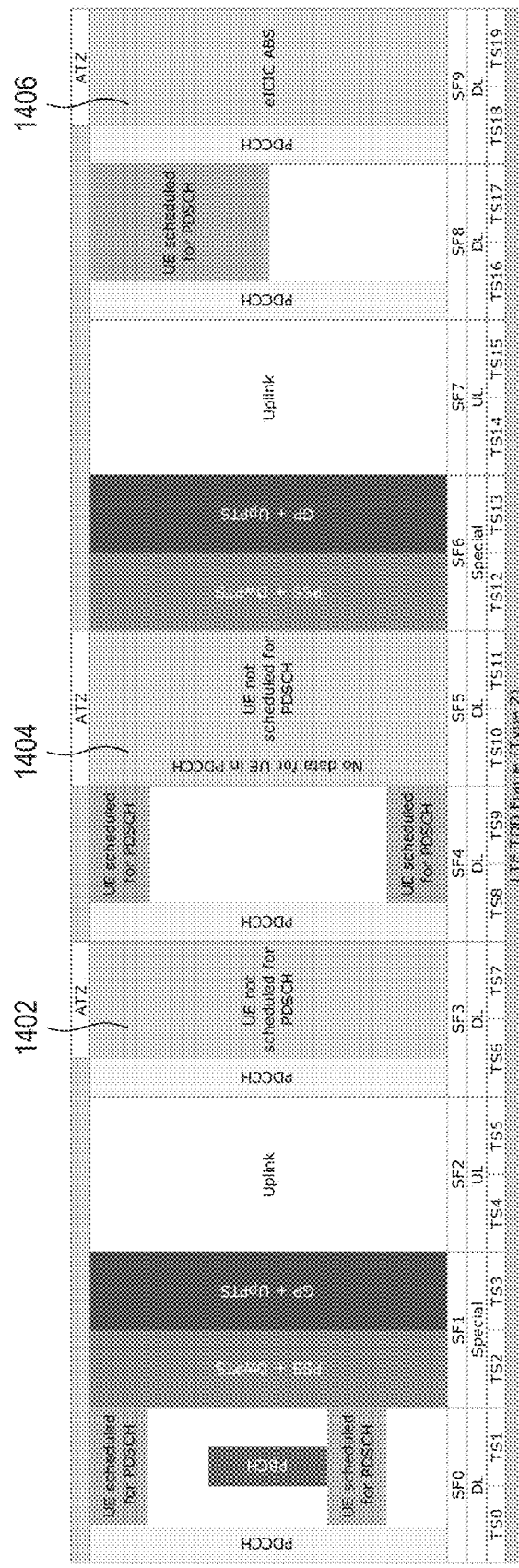
FIG. 14 shows three examples of locations where open loop antenna tuning zones (ATZ) can be positioned in a generic TDD LTE network, in accordance with some embodiments.

FIG. 14 shows three examples of locations where open loop antenna tuning zones (ATZ) can be positioned in a generic TDD LTE network; other examples can also be used.

Element 1402 shows an example of an ATZ over a partial subframe. At 1402, the UE receives the control information in the PDCCH, determines no data is scheduled in the PDSCH of the same subframe, and designates all remaining symbols as ATZ.

Element 1404 shows an example of an ATZ over a full subframe. At 1404, the UE determines from prior PDCCH information that it does not expect any control data from the eNodeB in this subframe, and it designates the entire subframe as ATZ.

Element 1406 shows an example of an ATZ over an almost blank subframe (ABS). At 1406, the UE is assumed to be operating on a network supporting enhanced inter-cell interference cancellation (eICIC), and it designates the entire ABS as ATZ.

Figure 15:
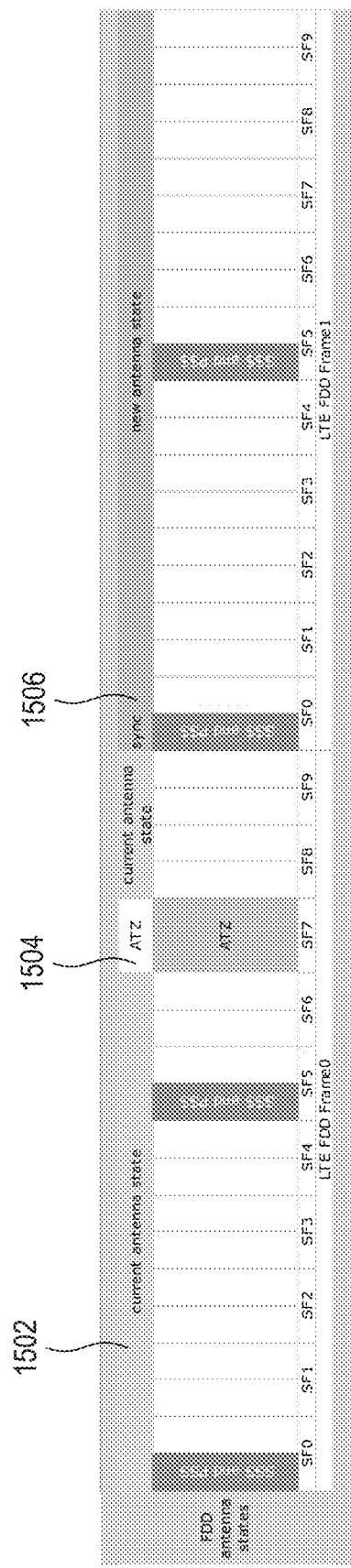
FIG. 15 shows an example of antenna tuning states in an FDD LTE network, in accordance with some embodiments.

FIG. 15 shows an example of antenna tuning states in an FDD LTE network. This is but one example; other suitable antenna tuning states can also be used.

At 1502, during the current LTE frame (Frame0), the UE receives all data scheduled for UE utilizing the current antenna tuning state.

At 1504, during an ATZ, the UE determines that a new antenna tuning state is preferred over the current antenna tuning state. During the ATZ, the UE selects a new antenna tuning state, receives the reference signal sequence from the eNodeB, estimates the channel fading coefficients, and calculates the antenna tuning optimization metric based on these coefficients. To improve the performance of the metric, the UE can also receive and demodulate the PDCCH (in the case of ATZ over a full subframe), and/or the UE can receive and demodulate other users' data in the PDSCH (providing the UE with a more robust estimate of the SINR). Upon completion of the ATZ, the UE tunes the antenna back to its current state and completes the reception of the current LTE frame. Any tuning transition time can be included within the ATZ in order to enable the UE to receive all scheduled data for the UE.

At 1506, the UE completes the reception of Frame0, tunes the antenna to the new state, synchronizes to the cell during the next available SSS and PSS, and continues operation with the new antenna state.

Figure 16:
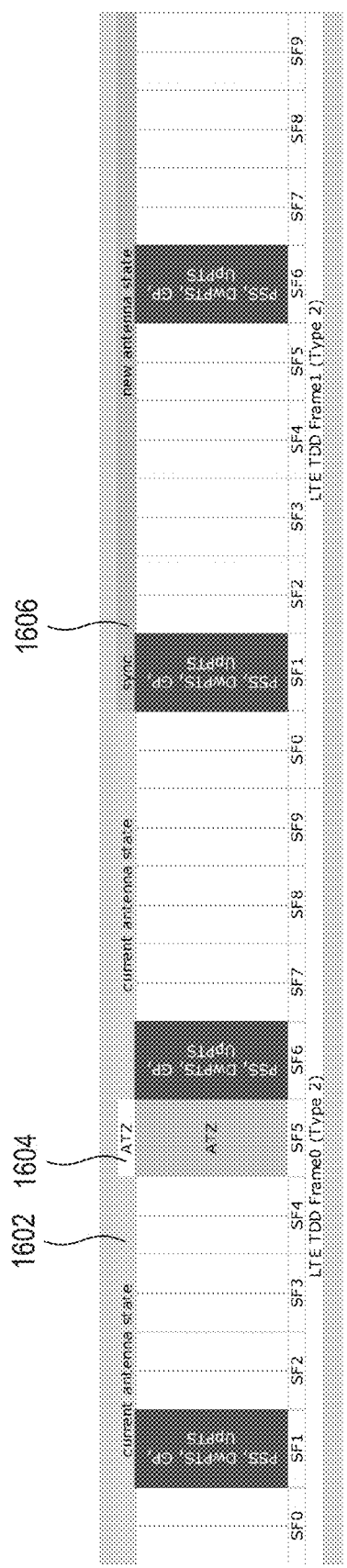
FIG. 16 shows an example of antenna tuning states in a TDD LTE network, in accordance with some embodiments.

FIG. 16 shows an example of antenna tuning states in a TDD LTE network. This is but one example; other suitable antenna tuning states can also be used.

At 1602, during the current LTE frame (Frame0), the UE receives all data scheduled for UE utilizing the current antenna tuning state.

At 1604, during an ATZ, the UE determines that a new antenna tuning state is preferred over the current antenna tuning state. During the ATZ, the UE selects a new antenna tuning state, receives the reference signal sequence from the eNodeB, estimates the channel fading coefficients, and calculates the antenna tuning optimization metric based on these coefficients. To improve the performance of the metric, the UE can also receive and demodulate the PDCCH (in the case of ATZ over a full subframe), and/or the UE can receive and demodulate other users' data in the PDSCH (providing the UE with a more robust estimate of the SINR). Upon completion of the ATZ, the UE tunes the antenna back to its current state and completes the reception of the current LTE frame. Any tuning transition time can be included within the ATZ in order to enable the UE to receive all scheduled data for the UE.

At 1606, the UE completes the reception of Frame0, tunes the antenna to the new state, synchronizes to the cell during the next available SSS and PSS, and continues operation with the new antenna state.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Figure 17:
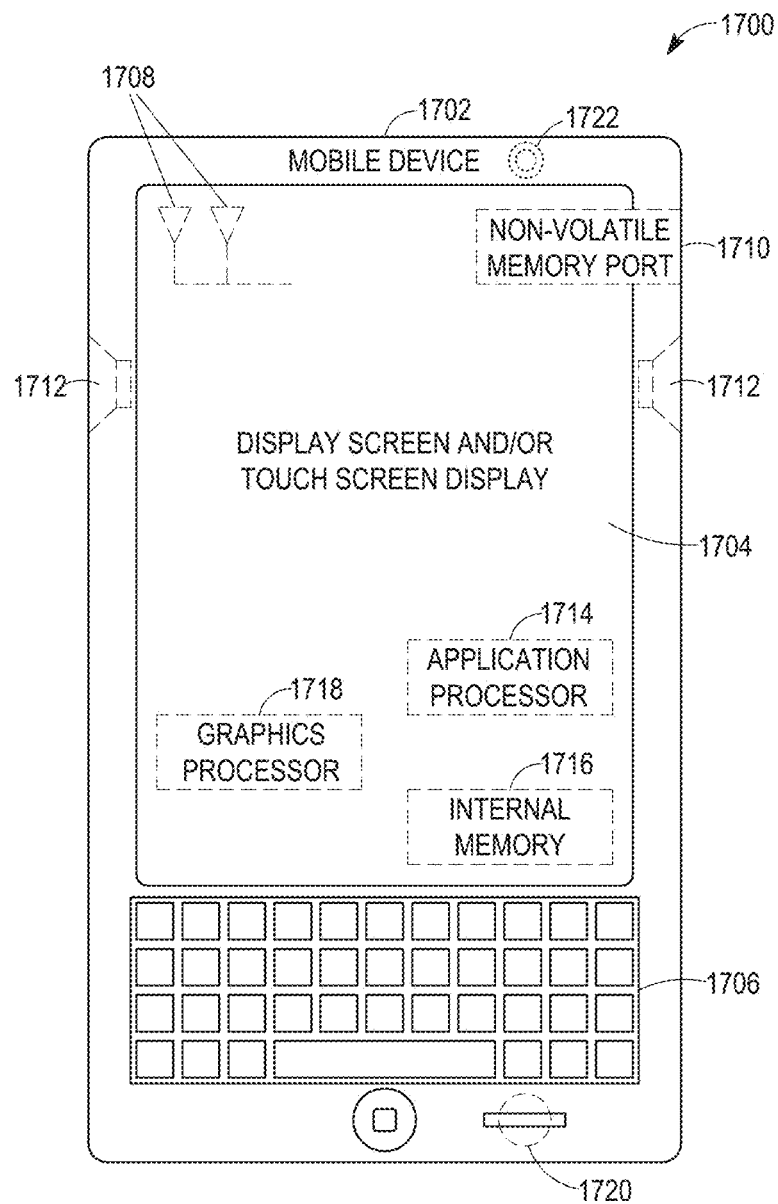
FIG. 17 illustrates an example of a mobile device, in accordance with some embodiments.

FIG. 17 illustrates an example of a mobile device 1700. The mobile device 1700 can be a user equipment (UE), a mobile station (MS), a mobile wireless device, a mobile communication device, a tablet, a handset, or other type of mobile wireless computing device. The mobile device 1700 can include one or more antennas 1708 within housing 1702 that are configured to communicate with a hotspot, base station (BS), an evolved NodeB (eNodeB), or other type of WLAN or WWAN access point. The mobile device 1700 can be configured to communicate using multiple wireless communication standards, including standards selected from 3GPP LTE, WiMAX, High Speed Packet Access (HSPA), Bluetooth, and Wi-Fi standard definitions. The mobile device 1700 can communicate using separate antennas for each wireless communication standard or shared antennas for multiple wireless communication standards. The mobile device 1700 can communicate in a WLAN, a WPAN, and/or a WWAN.

FIG. 17 also shows a microphone 1720 and one or more speakers 1712 that can be used for audio input and output from the mobile device 1700. A display screen 1704 can be a liquid crystal display (LCD) screen, or other type of display screen such as an organic light emitting diode (OLED) display. The display screen 1704 can be configured as a touch screen. The touch screen can use capacitive, resistive, or another type of touch screen technology. An application processor 1714 and a graphics processor 1718 can be coupled to internal memory 1716 to provide processing and display capabilities. A non-volatile memory port 1710 can also be used to provide data input/output options to a user. The non-volatile memory port 1710 can also be used to expand the memory capabilities of the mobile device 1700. A keyboard 1706 can be integrated with the mobile device 1700 or wirelessly connected to the mobile device 1700 to provide additional user input. A virtual keyboard can also be provided using the touch screen. A camera 1722 located on the front (display screen) side or the rear side of the mobile device 1700 can also be integrated into the housing 1702 of the mobile device 1700.

Figure 18:
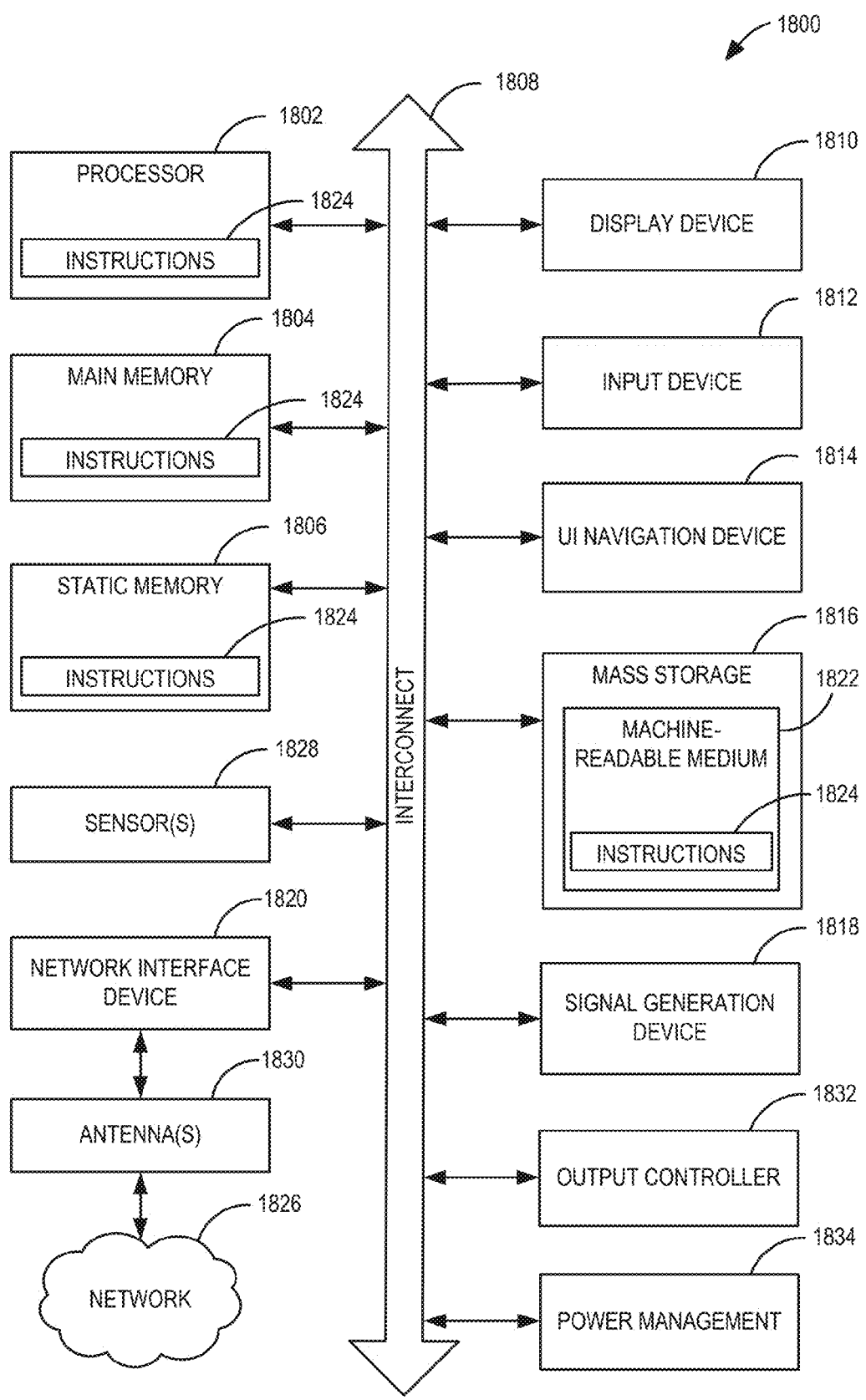
FIG. 18 is a block diagram illustrating an example computer system machine upon which any one or more of the methodologies herein discussed can be run, in accordance with some embodiments.

FIG. 18 is a block diagram illustrating an example computer system machine 1800 upon which any one or more of the methodologies herein discussed can be run. Computer system machine 1800 can be embodied as the local UE 106, the remote UE 108, or any other computing platform described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 1800 includes a processor 1802 (e.g., a central processing unit (CPU), a graphics processing unit (GPU) or both), a main memory 1804 and a static memory 1806, which communicate with each other via an interconnect 1808 (e.g., a link, a bus, etc.). The computer system machine 1800 can further include a video display unit 1810, an alphanumeric input device 1812 (e.g., a keyboard), and a user interface (UI) navigation device 1814 (e.g., a mouse). In one embodiment, the video display unit 1810, input device 1812 and UI navigation device 1814 are a touch screen display. The computer system machine 1800 can additionally include a storage device 1816 (e.g., a drive unit), a signal generation device 1818 (e.g., a speaker), an output controller 1832, a power management controller 1834, and a network interface device 1820 (which can include or operably communicate with one or more antennas 1830, transceivers, or other wireless communications hardware), and one or more sensors 1828, such as a Global Positioning Sensor (GPS) sensor, compass, location sensor, accelerometer, or other sensor.

The storage device 1816 includes a machine-readable medium 1822 on which is stored one or more sets of data structures and instructions 1824 (e.g., software) embodying or utilized by any one or more of the methodologies or functions described herein. The instructions 1824 can also reside, completely or at least partially, within the main memory 1804, static memory 1806, and/or within the processor 1802 during execution thereof by the computer system machine 1800, with the main memory 1804, static memory 1806, and the processor 1802 also constituting machine-readable media.

While the machine-readable medium 1822 is illustrated in an example embodiment to be a single medium, the term "machine-readable medium" can include a single medium or multiple media (e.g., a centralized or distributed database, and/or associated caches and servers) that store the one or more instructions 1824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 1824 can further be transmitted or received over a communications network 1826 using a transmission medium via the network interface device 1820 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes the subject matter embodied by a user equipment (UE) configured to transmit a data stream to an Evolved Node B (eNodeB), the UE comprising: at least one antenna port, each antenna port being connectable to an antenna capable of transmitting data from the data stream to the eNodeB at one of a plurality of selectable tuning states, the combination of antenna ports and tuning states forming a plurality of selectable antenna states for the UE; and circuitry configured to: transmit to the eNodeB a first portion of the data stream over a first antenna state of the plurality; sequentially transmit to the eNodeB a test signal over each antenna state in the plurality; receive from the eNodeB an indication that the test signal transmitted on a second antenna state of the plurality is stronger at the eNodeB than the test signal transmitted on the first antenna state; and transmit to the eNodeB a second portion of the data stream over the second antenna state.

In Example 2, the subject matter of Example 1 can optionally include the method of example 1, wherein the circuitry is further configured to: prior to transmitting each test signal to the eNodeB, transmit a respective Sounding Reference Signal (SRS) to the eNodeB over the respective antenna state, the SRS forming at least a portion of an Antenna Tuning Subframe (ATSF) of a Long Term Evolution (LTE) frame structure.

In Example 3, the subject matter of any one of Examples 1-2 can optionally include wherein the circuitry is further configured to transmit the test signals and receive the indication from the eNodeB using protocols of the physical layer.

In Example 4, the subject matter of any one of Examples 1-3 can optionally include wherein the circuitry is further configured to receive a modified DCI Format 4 message in a Physical Downlink Control Channel (PDCCH) to initiate the sequential transmissions of the test signals.

In Example 5, the subject matter of any one of Examples 1-4 can optionally include wherein the indication from the eNodeB is a received modified Downlink Control Indicator (DCI) Format 4 message in a Physical Downlink Control Channel (PDCCH).

In Example 6, the subject matter of any one of Examples 1-5 can optionally include wherein the received DCI Format 4 message includes a Sounding Reference Signal (SRS) Report field having a value corresponding to the second antenna state of the plurality.

In Example 7, the subject matter of any one of Examples 1-6 can optionally include wherein the received DCI Format 4 message includes a precoding matrix (PMI) and rank indicator (RI) field having a value that indicates a best-matched precoding matrix to be used for transmitting the second portion of the data stream.

In Example 8, the subject matter of any one of Examples 1-7 can optionally include wherein the circuitry is further configured to transmit the test signals and receive the indication from the eNodeB using protocols of the upper layer.

In Example 9, the subject matter of any one of Examples 1-8 can optionally include wherein the circuitry is further configured to receive an upper layer configuration message from the eNodeB to initiate the sequential transmissions of the test signals.

In Example 10, the subject matter of any one of Examples 1-9 can optionally include wherein the received upper layer configuration message includes a Sounding Reference Signal (SRS) Report Antenna Tuning Subframe (ATSF) Counter field having a value corresponding to one of the antenna states.

In Example 11, the subject matter of any one of Examples 1-10 can optionally include wherein the SRS ATSF Counter field is incremented for each of the sequential test signal transmissions.

In Example 12, the subject matter of any one of Examples 1-11 can optionally include wherein the received upper layer configuration message includes a Sounding Reference Signal (SRS) Report Antenna Tuning Subframe (ATSF) Counter Reset field having a value directing the UE to reset the SRS ATSF Counter field and begin sequentially transmitting the test signals to the eNodeB.

In Example 13, the subject matter of any one of Examples 1-12 can optionally include wherein the circuitry is further configured to: cease transmitting to the eNodeB the first portion of the data stream over the first antenna state at a first predetermined time; sequentially transmit to the eNodeB the test signal over each antenna state in the plurality beginning at a second predetermined time; receive, at a third predetermined time, from the eNodeB an indication that the test signal transmitted on a second antenna state of the plurality is stronger at the eNodeB than the test signal transmitted on the first antenna state; and transmit to the eNodeB the second portion of the data stream over the second antenna state beginning at a fourth predetermined time; cease transmitting to the eNodeB the second portion of the data stream over the second antenna state at a fifth predetermined time; sequentially transmit to the eNodeB a test signal over each antenna state in the plurality beginning at a sixth predetermined time; receive, at a seventh predetermined time, from the eNodeB an indication that the test signal transmitted on a third antenna state of the plurality is stronger at the eNodeB than the test signal transmitted on the second antenna state; and transmit to the eNodeB a third portion of the data stream over the third antenna state beginning at an eighth predetermined time.

In Example 14, the subject matter of any one of Examples 1-13 can optionally include at least one transceiver having a radio frequency front end (RFFE) configured to apply a selectable tuning state to a respective antenna port; wherein the RFFE selects each tuning state by applying at least one of a selectable impedance or a selectable aperture to the respective antenna port.

In Example 15, the subject matter of any one of Examples 1-14 can optionally include memory configured to store instructions for controlling the circuitry; and wherein the circuitry includes processing circuitry configured to execute the instructions stored in the memory.

In Example 16, the subject matter of any one of Examples 1-15 can optionally include wherein the UE comprises a plurality of antenna ports, and further comprising: a plurality of antenna tuner elements electrically coupled to respective antenna ports, of the plurality of antenna ports, each antenna tuner element configured to receive a tuner control signal that specifies a selected tuning state for the respective antenna, each antenna tuner element further configured to receive a radio frequency (RF) signal corresponding to data from the data stream; a plurality of transceivers electrically coupled to respective antenna tuner elements, of the plurality of antenna tuner elements, each transceiver configured to receive data from the data stream and generate the respective RF signal; and a multiple-output (MIMO) modem electrically coupled to the plurality of antenna tuner elements, the MIMO modem configured to select one of the plurality of transceivers, provide data from the data stream to the selected transceiver, and generate the tuner control signal for the selected transceiver.

In Example 17, the subject matter of any one of Examples 1-16 can optionally include a plurality of antennas connectable to respective antenna ports, of the plurality of antenna ports.

Example 18 is a non-transitory computer-readable medium containing instructions which, when executed, perform operations to configure a user equipment (UE) to transmit a data stream to an Evolved Node B (eNodeB), the UE including a plurality of antenna states configured for transmitting from the UE, the operations to configure the UE to: transmit to the eNodeB a first portion of the data stream over a first antenna state of the plurality; sequentially transmit to the eNodeB a test signal over each antenna state in the plurality; receive from the eNodeB an indication that the test signal transmitted on a second antenna state of the plurality is stronger at the eNodeB than the test signal transmitted on the first antenna state; and transmit to the eNodeB a second portion of the data stream over the second antenna state; wherein the operations to further configure the UE to transmit the test signals and receive the indication from the eNodeB using protocols of one of a physical layer or an upper layer.

In Example 19, the subject matter of Example 18 can optionally include wherein the operations are further configured to: prior to transmitting each test signal to the eNodeB, transmit a respective Sounding Reference Signal (SRS) to the eNodeB over the respective antenna state, the SRS forming at least a portion of an Antenna Tuning Subframe (ATSF) of a Long Term Evolution (LTE) frame structure.

In Example 20, the subject matter of any one of Examples 18-19 can optionally include wherein the operations are further configured to: cease transmitting to the eNodeB the first portion of the data stream over the first antenna state at a first predetermined time; sequentially transmit to the eNodeB the test signal over each antenna state in the plurality beginning at a second predetermined time; receive, at a third predetermined time, from the eNodeB an indication that the test signal transmitted on a second antenna state of the plurality is stronger at the eNodeB than the test signal transmitted on the first antenna state; and transmit to the eNodeB the second portion of the data stream over the second antenna state beginning at a fourth predetermined time; cease transmitting to the eNodeB the second portion of the data stream over the second antenna state at a fifth predetermined time; sequentially transmit to the eNodeB a test signal over each antenna state in the plurality beginning at a sixth predetermined time; receive, at a seventh predetermined time, from the eNodeB an indication that the test signal transmitted on a third antenna state of the plurality is stronger at the eNodeB than the test signal transmitted on the second antenna state; and transmit to the eNodeB a third portion of the data stream over the third antenna state beginning at an eighth predetermined time.

Example 21 is a method for transmitting a data stream to an Evolved Node B (eNodeB), the method comprising: transmitting to the eNodeB a first portion of the data stream over a first antenna state, of a plurality of antenna states; sequentially transmitting to the eNodeB a test signal over each antenna state in the plurality; receiving from the eNodeB an indication that the test signal transmitted on a second antenna state of the plurality is stronger at the eNodeB than the test signal transmitted on the first antenna state; and transmitting to the eNodeB a second portion of the data stream over the second antenna state; and further comprising prior to transmitting each test signal to the eNodeB, transmitting a respective Sounding Reference Signal (SRS) to the eNodeB over the respective antenna state, the SRS forming at least a portion of an Antenna Tuning Subframe (ATSF) of a Long Term Evolution (LTE) frame structure.

In Example 22, the subject matter of Example 21 can optionally include ceasing transmitting to the eNodeB the first portion of the data stream over the first antenna state at a first predetermined time; sequentially transmitting to the eNodeB the test signal over each antenna state in the plurality beginning at a second predetermined time; receiving, at a third predetermined time, from the eNodeB an indication that the test signal transmitted on a second antenna state of the plurality is stronger at the eNodeB than the test signal transmitted on the first antenna state; and transmitting to the eNodeB the second portion of the data stream over the second antenna state beginning at a fourth predetermined time; ceasing transmitting to the eNodeB the second portion of the data stream over the second antenna state at a fifth predetermined time; sequentially transmitting to the eNodeB a test signal over each antenna state in the plurality beginning at a sixth predetermined time; receiving, at a seventh predetermined time, from the eNodeB an indication that the test signal transmitted on a third antenna state of the plurality is stronger at the eNodeB than the test signal transmitted on the second antenna state; and transmitting to the eNodeB a third portion of the data stream over the third antenna state beginning at an eighth predetermined time.

In Example 23, the subject matter of any one of Examples 21-22 can optionally include wherein the test signals are transmitted and the indication from the eNodeB is received the using protocols of a physical layer.

In Example 24, the subject matter of any one of Examples 21-23 can optionally include wherein the test signals are transmitted and the indication from the eNodeB is received the using protocols of an upper layer.

Example 25 is at least one computer readable medium containing program instructions for causing a computer to perform the method of any one of Examples 21-24.

Example 26 is an apparatus having means to perform any of the methods of any one of Examples 21-24.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) configured to transmit a data stream to an Evolved Node B (eNodeB), the UE comprising:
    at least one antenna port, each antenna port being connectable to an antenna capable of transmitting data from the data stream to the eNodeB at one of a plurality of selectable tuning states, the combination of antenna ports and tuning states forming a plurality of selectable antenna states for the UE, wherein the selectable tuning states are associated with at least one of a selectable impedance or a selectable aperture for the antenna; and
    circuitry configured to:
        transmit to the eNodeB a first portion of the data stream over a first antenna state of the plurality;
        sequentially transmit to the eNodeB a test signal over each antenna state in the plurality;
        receive from the eNodeB an indication that the test signal transmitted on a second antenna state of the plurality is stronger at the eNodeB than the test signal transmitted on the first antenna state; and
        transmit to the eNodeB a second portion of the data stream over the second antenna state.

2. The UE of claim 1, wherein the circuitry is further configured to transmit the test signals and receive the indication from the eNodeB using protocols of a physical layer.

3. The UE of claim 2, wherein the indication from the eNodeB is a received modified Downlink Control Indicator (DCI) Format 4 message in a Physical Downlink Control Channel (PDCCH).

4. The UE of claim 3, wherein the received DCI Format 4 message includes a Sounding Reference Signal (SRS) Report field having a value corresponding to the second antenna state of the plurality.

5. The UE of claim 3, wherein the received DCI Format 4 message includes a precoding matrix (PMI) and rank indicator (RI) field having a value that indicates a best-matched precoding matrix to be used for transmitting the second portion of the data stream.

6. The UE of claim 1, wherein the circuitry is further configured to transmit the test signals and receive the indication from the eNodeB using protocols of an upper layer.

7. The UE of claim 6, wherein the circuitry is further configured to receive an upper layer configuration message from the eNodeB to initiate the sequential transmissions of the test signals.

8. The UE of claim 7, wherein the received upper layer configuration message includes a Sounding Reference Signal (SRS) Report Antenna Tuning Subframe (ATSF) Counter field having a value corresponding to one of the antenna states.

9. The UE of claim 8, wherein the SRS ATSF Counter field is incremented for each of the sequential test signal transmissions.

10. The UE of claim 7, wherein the received upper layer configuration message includes a Sounding Reference Signal (SRS) Report Antenna Tuning Subframe (ATSF) Counter Reset field having a value directing the UE to reset the SRS ATSF Counter field and begin sequentially transmitting the test signals to the eNodeB.

11. The UE of claim 1, wherein the circuitry is further configured to:
cease transmitting to the eNodeB the first portion of the data stream over the first antenna state at a first predetermined time;
sequentially transmit to the eNodeB the test signal over each antenna state in the plurality beginning at a second predetermined time;
receive, at a third predetermined time, from the eNodeB an indication that the test signal transmitted on a second antenna state of the plurality is stronger at the eNodeB than the test signal transmitted on the first antenna state; and
transmit to the eNodeB the second portion of the data stream over the second antenna state beginning at a fourth predetermined time;
cease transmitting to the eNodeB the second portion of the data stream over the second antenna state at a fifth predetermined time;
sequentially transmit to the eNodeB a test signal over each antenna state in the plurality beginning at a sixth predetermined time;
receive, at a seventh predetermined time, from the eNodeB an indication that the test signal transmitted on a third antenna state of the plurality is stronger at the eNodeB than the test signal transmitted on the second antenna state; and
transmit to the eNodeB a third portion of the data stream over the third antenna state beginning at an eighth predetermined time.

12. The UE of claim 1, further comprising:
at least one transceiver having a radio frequency front end (RFFE) configured to apply one of the selectable tuning states to a respective one of the antenna ports;
wherein the RFFE selects each tuning state by applying the at least one of a selectable impedance or a selectable aperture to the respective antenna port.

13. The UE of claim 1, further comprising:
memory configured to store instructions for controlling the circuitry; and
wherein the circuitry includes processing circuitry configured to execute the instructions stored in the memory.

14. The UE of claim 1, wherein the UE comprises a plurality of antenna ports, and further comprising:
a plurality of antenna tuner elements electrically coupled to respective antenna ports, of the plurality of antenna ports, each antenna tuner element configured to receive a tuner control signal that specifies a selected tuning state for the respective antenna, each antenna tuner element further configured to receive a radio frequency (RF) signal corresponding to data from the data stream;
a plurality of transceivers electrically coupled to respective antenna tuner elements, of the plurality of antenna tuner elements, each transceiver configured to receive data from the data stream and generate the respective RF signal; and
a multiple-output (MIMO) modem electrically coupled to the plurality of antenna tuner elements, the MIMO modem configured to select one of the plurality of transceivers, provide data from the data stream to the selected transceiver, and generate the tuner control signal for the selected transceiver.

15. The UE of claim 14, further comprising a plurality of antennas connectable to respective antenna ports, of the plurality of antenna ports.

16. A user equipment (UE) configured to transmit a data stream to an Evolved Node B (eNodeB), the UE comprising:
at least one antenna port, each antenna port being connectable to an antenna capable of transmitting data from the data stream to the eNodeB at one of a plurality of selectable tuning states, the combination of antenna ports and tuning states forming a plurality of selectable antenna states for the UE; and
circuitry configured to:
transmit to the eNodeB a first portion of the data stream over a first antenna state of the plurality using protocols of a physical layer;
receive a modified DCI Format 4 message in a Physical Downlink Control Channel (PDCCH), the received modified DCI Format 4 message including a Sounding Reference Signal (SRS) Report field having a value corresponding to the second antenna state of the plurality, the received modified DCI Format 4 message further including a precoding matrix (PMI) and rank indicator (RI) field having a value that indicates a best-matched precoding matrix to be used for transmitting a second portion of the data stream;
in response to the received modified DCI Format 4 message, sequentially transmit to the eNodeB a test signal over each antenna state in the plurality using the protocols of the physical layer;
receive from the eNodeB an indication that the test signal transmitted on a second antenna state of the plurality is stronger at the eNodeB than the test signal transmitted on the first antenna state, the indication from the eNodeB being a received modified Downlink Control Indicator (DCI) Format 4 message in a Physical Downlink Control Channel (PDCCH); and transmit to the eNodeB the second portion of the data stream over the second antenna state.

17. A user equipment (UE) configured to transmit a data stream to an Evolved Node B (eNodeB), the UE comprising:
at least one antenna port, each antenna port being connectable to an antenna capable of transmitting data from the data stream to the eNodeB at one of a plurality of selectable tuning states, the combination of antenna ports and tuning states forming a plurality of selectable antenna states for the UE; and
circuitry configured to:
 transmit to the eNodeB a first portion of the data stream over a first antenna state of the plurality using protocols of an upper layer;
 receive an upper layer configuration message from the eNodeB including a Sounding Reference Signal (SRS) Report Antenna Tuning Subframe (ATSF) Counter field having a value corresponding to one of the plurality of antenna states, the received upper layer configuration message further including a Sounding Reference Signal (SRS) Report Antenna Tuning Subframe (ATSF) Counter Reset field having a value directing the UE to reset the SRS ATSF Counter field and begin sequentially transmitting the test signals to the eNodeB;
 in response to the received upper layer configuration message, sequentially transmit to the eNodeB a test signal over each antenna state in the plurality using the protocols of the upper layer;
 receive from the eNodeB an indication that the test signal transmitted on a second antenna state of the plurality is stronger at the eNodeB than the test signal transmitted on the first antenna state; and
 transmit to the eNodeB a second portion of the data stream over the second antenna state;
 wherein the SRS ATSF Counter field is incremented for each of the sequential test signal transmissions.

18. A user equipment (UE) configured to transmit a data stream to an Evolved Node B (eNodeB), the UE comprising:
at least one antenna port, each antenna port being connectable to an antenna capable of transmitting data from the data stream to the eNodeB at one of a plurality of selectable tuning states, the combination of antenna ports and tuning states forming a plurality of selectable antenna states for the UE; and
circuitry configured to:
 transmit to the eNodeB a first portion of the data stream over a first antenna state of the plurality;
 sequentially transmit to the eNodeB a test signal over each antenna state in the plurality;
 receive from the eNodeB an indication that the test signal transmitted on a second antenna state of the plurality is stronger at the eNodeB than the test signal transmitted on the first antenna state; and
 transmit to the eNodeB a second portion of the data stream over the second antenna state,
 wherein the circuitry is further configured to:
 prior to transmitting each test signal to the eNodeB, transmit a respective Sounding Reference Signal (SRS) to the eNodeB over the respective antenna state, the SRS forming at least a portion of an Antenna Tuning Subframe (ATSF) of a Long Term Evolution (LTE) frame structure.

19. A user equipment (UE) configured to transmit a data stream to an Evolved Node B (eNodeB), the UE comprising:
at least one antenna port, each antenna port being connectable to an antenna capable of transmitting data from the data stream to the eNodeB at one of a plurality of selectable tuning states, the combination of antenna ports and tuning states forming a plurality of selectable antenna states for the UE; and
circuitry configured to:
 transmit to the eNodeB a first portion of the data stream over a first antenna state of the plurality;
 sequentially transmit to the eNodeB a test signal over each antenna state in the plurality;
 receive from the eNodeB an indication that the test signal transmitted on a second antenna state of the plurality is stronger at the eNodeB than the test signal transmitted on the first antenna state; and
 transmit to the eNodeB a second portion of the data stream over the second antenna state,
 wherein the circuitry is further configured to:
 transmit the test signals and receive the indication from the eNodeB using protocols of a physical layer; and
 receive a modified DCI Format 4 message in a Physical Downlink Control Channel (PDCCH) to initiate the sequential transmissions of the test signals.

* * * * *